United States Patent
Kim

(10) Patent No.: US 7,752,296 B2
(45) Date of Patent: Jul. 6, 2010

(54) DEVICE MANAGEMENT SYSTEM AND DEVICE MANAGEMENT COMMAND SCHEDULING METHOD THEREOF

(75) Inventor: Te-Hyun Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 1026 days.

(21) Appl. No.: 11/178,019

(22) Filed: Jul. 8, 2005

(65) Prior Publication Data

US 2006/0026228 A1 Feb. 2, 2006

Related U.S. Application Data

(60) Provisional application No. 60/621,590, filed on Oct. 22, 2004, provisional application No. 60/677,046, filed on May 2, 2005.

(30) Foreign Application Priority Data

| Jul. 9, 2004 | (KR) | ...................... 10-2004-0053663 |
| Aug. 5, 2004 | (KR) | ...................... 10-2004-0061846 |
| Jul. 6, 2005 | (KR) | ...................... 10-2005-0060764 |

(51) Int. Cl.
*G06F 15/173* (2006.01)
(52) U.S. Cl. .................. 709/223; 709/203; 709/224
(58) Field of Classification Search ................. 709/223, 709/224, 203, 217, 219
See application file for complete search history.

(56) References Cited

U.S. PATENT DOCUMENTS

| 6,665,731 | B1 | 12/2003 | Kumar et al. | |
| 6,928,646 | B1* | 8/2005 | James et al. | 718/104 |
| 7,043,532 | B1* | 5/2006 | Humpleman et al. | 709/208 |
| 2002/0049709 | A1* | 4/2002 | Miyasaki et al. | 707/1 |
| 2002/0059465 | A1 | 5/2002 | Kim | |
| 2002/0152105 | A1* | 10/2002 | Dan et al. | 705/8 |
| 2003/0204640 | A1 | 10/2003 | Sahinoja et al. | |
| 2005/0289229 | A1* | 12/2005 | Kim | 709/223 |
| 2006/0015626 | A1* | 1/2006 | Hallamaa et al. | 709/229 |
| 2007/0033623 | A1* | 2/2007 | Fredrickson et al. | 725/88 |
| 2007/0174444 | A1* | 7/2007 | Kim et al. | 709/223 |
| 2007/0174445 | A1* | 7/2007 | Kim | 709/223 |
| 2007/0174446 | A1* | 7/2007 | Kim et al. | 709/223 |
| 2007/0174447 | A1* | 7/2007 | Kim et al. | 709/223 |
| 2007/0174462 | A1* | 7/2007 | Kim et al. | 709/226 |
| 2008/0127190 | A1* | 5/2008 | Shu et al. | 718/102 |
| 2008/0189404 | A1* | 8/2008 | He et al. | 709/223 |

FOREIGN PATENT DOCUMENTS

| EP | 01513317 A2 | 3/2005 |
| EP | 01515571 A2 | 3/2005 |
| JP | 2003-345682 | 12/2003 |

OTHER PUBLICATIONS

Ogane, H.; "TCP/IP and OSI Network Management"; NE Series: SNMP and CMIP; Soft Research Center; Apr. 15, 1993; pp. 256-258.

* cited by examiner

*Primary Examiner*—Lashonda T Jacobs
(74) *Attorney, Agent, or Firm*—Lee, Hong, Degerman, Kang & Waimey

(57) ABSTRACT

A device management system and device management scheduling method thereof, in which a server transmits to a client a scheduling context including a device management command and a schedule for the performing of the device management command, and the client generates a device management tree using the device management scheduling context, performs the command when a specific scheduling condition is satisfied, and, if necessary, reports the command performance result to the server, whereby the server performs a device management such as requesting a command to be performed under a specific condition, dynamically varying the scheduling condition, and the like.

27 Claims, 11 Drawing Sheets

```
<!--Root Element-->
<!ELEMENT Command (#PCDATA)>
```

```
<!ELEMENT Sched (SimpSched)+>
<!ELEMENT SimpSched (Th+ | Dur+ | Per+)+>
<!ELEMENT Dur (#PCDATA)>
<!ELEMENT Per (#PCDATA)>
<!ELEMENT Th (#PCDATA)>

<!ATTLIST Sched MgntObj CDATA #IMPLIED>
<!ATTLIST Th Hyst CDATA "0">
```

FIG.6

```
<!-- Example 1: from now till a specified data&time -->
<Dur>im..2004-08-26T23:59:59Z</Dur>

<!-- Example 2: from now till 1 hour -->
<Dur>im..im~3600</Dur>

<!-- Example 3: from 60 seconds later from now till forever -->
<Dur>im~60..</Dur>
```

FIG. 7

```
ThContent = ThContentItem * (IS ThContentItem)
ThContentItem = OP (ThGroup / EventRange / ThRange) CP
ThGroup = (ThDelta * (IS ThDelta)) / (TW [ EO ThExc ] )
ThDelta = Threshold [DO Delta]
ThExc = OP ThDelta * (IS ThDelta) CP
EventRange = Event ERP Event
Event = OP (ThGroup / ThRange) CP
ThRange = [Threshold] TRO [Threshold] [ DO Delta ] [ EO ThRangeExc ]
ThRangeExc = OP TREP * (IS TREP) CP
TREP = ThDelta / ( [Threshold] TRO [Threshold] ) ; Threshold Range Exclusion Particle
Delta = OP Threshold * (IS Threshold) CP
Threshold = 1*ContentChar
ContentChar = ALPHA / DIGIT / NonEscaped
TW = "*"                                ; Threshold Wildcard
OP = "("                                ; Opening Parenthesis
CP = ")"                                ; Closing Parenthesis
ERO = "~"                               ; Event Range Operator
TRO = ".."                              ; Threshold Range Operator
IS = "#"                                ; Item Separator
DO = ","                                ; Delta Operator
EO = "|"                                ; Exclusion Operator
NonEscaped = "any printable character except those escaped characters"
```

FIG.8

| Rule | Definition | Examples | Description |
|---|---|---|---|
| TRO | ".." | (100..500), (100..), (..|(10,(10))) | Threshold Range Operator: This operator is used to specify a Threshold Range. Threshold elements shall be used to specify the lower and upper end boundaries for this operator. But, it is possible to leave it open-ended at each side or both sides. The special range open-ended at both sides is called a Threshold Range Wildcard. See above to find the description of ThRange rule, for more information. |
| ERO | "~" | ((..50)~(150..)), (Fatal~) | Event Range Operator: This operator is used to specify an Event Range. The Event Range is the range of which the boundaries are specified by Event elements. It can be open-ended at each side or both sides. The special range open-ended at both sides is called an Event Range Wildcard. See above to find the description of EventRange rule, for more information. |
| DO | "," | (0..100,(3#10)), (100,(-10)) | Delta Operator: This operator can be appended to a Threshold or a Threshold Range to specify a list of incremental Triggers in addition to those specified by the Threshold or the Threshold Range. The Deltas shall not be used consecutively. That is, the Delta for a Delta is not allowed. |
| EO | "|" | (-10..10|(2,(2)#5,(5))), (..|(100..199)), (1..10,(2)|(6)) | Exclusion Operator: This operator is useful when representing a big group of Items with only a few Items excluded. In that case, it is more convinient to use a wildcard together with this operator so that the size of the content be maintained as small as possible. |
| IS | "#" | (1)#(2)#(5,(5)), (0..20)#(100..) | Item Separator: This operator is a delimiter used to separate each Items from one another. |
| OP, CP | "(", ")" | (1)#(2)#(3), | Openning Parenthesis, Closing Parenthesis: The parenthesis is used to mark the beggining and end of a Group. They are used to group more than one rules and terminals together. The parenthesis overrides the default precedence among operators. The usage of the parenthesis shall be in compliance of the syntax defined above. |
| TW | "*" | (*|(Fatal)) | Threshold Wildcard: This special symbol is equivalent to the complete list of valid Thresholds, which means Triggers are generated at each and every changes in the associated management object value. But, it does not specify any Condition. |

FIG.9

| Name | Type | Occurrence | Description |
|---|---|---|---|
| Hyst | CDATA | default | Default value is '0'. Should have a non-negative value except '-0', which means an infinite number. |
| MgntObj | CDATA | #IMPLIED | Should have a URI for the associated management object. |

FIG.10

```
<!-- scheduling of GET: process GET of a node value when it is equal to 1200, 1400,
..., 3000, or every 60 seconds while the value falls between 1800 and 3000. -->
<Get>
  <CmdID>4</CmdID>
  <Item>
    <Target>
      <LocURI>./monitoring/number</LocURI>
    </Target>
  </Item>
  <Sched>
    <SimpSched>
      <Th Hyst="10">(1200..3000,(200))</Th>
    </SimpSched>
    <SimpSched>
      <Th Hyst="10">(1800..3000)</Th>
      <Per>60</Per>
    </SimpSched>
  </Sched>
</Get>
```

DEVICE MANAGEMENT SYSTEM AND DEVICE MANAGEMENT COMMAND SCHEDULING METHOD THEREOF

CROSS REFERENCE TO RELATED APPLICATIONS

This application claims the benefit of the Korean Application Nos. 53663/2004, 61846/2004 and 60764/2005 filed on Jul. 9, 2004, Aug. 5, 2004 and Jul. 6, 2005; and U.S. Provisional Application Nos. 60/621,590 and 60/677,046 filed on Oct. 22, 2004 and May 2, 2005, which are hereby incorporated by reference in their entirety.

BACKGROUND OF THE INVENTION

1. Field of the Invention

The present invention relates to device management and data synchronization techniques, and particularly, to a device management system and a device management command scheduling method thereof.

2. Background of the Related Art

In general, Device Management (DM) techniques relate to performing specific processing commands by a client as soon as a particular processing command is received from a server.

In such a DM technique, a DM server instructs a processing command to a DM client, and the DM client immediately performs the corresponding command. Afterwards, the DM client performs a report procedure regarding the results in performing those commands.

In addition, the DM server requests the DM client to vary, update, and delete a specific function. If the DM client is currently in a state that it can not perform the request from the DM server, a DM session for checking the state (status) of the DM client should be periodically generated and/or inquired by the DM server, and the issues and problems related thereto should be considered. Therefore, in the related art DM method, procedures for allowing the DM server to performs commands of the DM server at a desired time point, status, and have not been proposed thus far.

Additionally, in the related art, because the DM client must immediately perform the DM command (sent by the DM server upon opening (starting) a DM session) during the DM session, such DM command cannot be performed outside (after) the DM session upon considering the internal state of the device or upon occurrence of various events, and cannot be performed at particular desired times or situations. These related art restrictions not only increased the costs involved in performing state diagnosis procedures for the device, but also, effective diagnosis and effective problem solving that could be achieved by appropriate measures upon detecting problems before they may occur were impossible to perform. Also, these related art restrictions always required new DM sessions for performing DM commands, and thus, undesirably high device management costs had to be tolerated.

SUMMARY OF THE INVENTION

Therefore, an object of the present invention is to provide a device management system in which a server can dynamically manage a device management scheduling of a client, and a device management scheduling method in the system.

Another object of the present invention is to provide a device management system and a device management scheduling method in which a server can establish a device management scheduling in a client and vary and delete the established device management scheduling.

Still another object of the present invention is to provide a device management system and a device management scheduling method in the system in which a server can schedule a device management command or a data synchronization command of a client and thus the client can report the status of a device, perform scheduled programs and use optimal parameter values.

To achieve these and other advantages and in accordance with the purpose of the present invention, as embodied and broadly described herein, there is provided a device management scheduling method comprising: delivering a scheduling context from a server to a client; generating a device management tree using the delivered scheduling context and establishing a device management scheduling by the client; and performing, by the client, the device management scheduling according to a command performing condition (i.e., a condition for performing a command) of the established device management scheduling.

The device management scheduling method further comprises: generating the device management tree using a new scheduling context delivered from the server, and varying the device management scheduling; selectively reporting to the server a performance result of the device management scheduling, by the client, according to status report gating information within the generated device management tree; and requesting the client, by the server, to delete the pre-established device management scheduling.

Preferably, the step of establishing the device management scheduling includes: certifying validity of the delivered scheduling context; and generating at least one or more device management scheduling sub-trees using the device management scheduling context when the scheduling context is completely certified.

To achieve these and other advantages and in accordance with the purpose of the present invention, a device management system comprises: a server for generating and transmitting a scheduling context including a device management command and a schedule for performing the device management command; and a client for generating a device management tree using the transmitted device management scheduling context to thus generate a device management scheduling, and performing the device management scheduling according to a command performing condition (i.e., a condition for performing a command) of the generated device management scheduling.

Preferably, the server transmits a new scheduling context to the client so as to request the client to vary the device management scheduling, and transmits a device management delete command to the client so as to request the delete for the pre-installed device management scheduling context.

Preferably, the client selectively reports to the server the performance result of the device management scheduling according to status report gating information of the device management scheduling.

Preferably, the client includes: a command processing module for generating a device management session with the server and thereafter receiving the scheduling context from the server; and a scheduling module for generating the device management tree using the scheduling context delivered from the command processing module, notifying the satisfaction of the command performing condition to the command processing module so as to perform the corresponding device management command when the command performing condition is satisfied, and receiving a processing result of the device management command from the command processing module to thusly selectively report it to a DM (Device Management) server.

Preferably, the command processing module includes: a function unit for delivering the scheduling context transmitted from the server to the scheduling module; a function unit for performing the corresponding scheduled command according to the notification of the scheduling module, and transferring the performance result of the corresponding command to the scheduling module; and a function unit for delivering a scheduling context status report transferred from the scheduling module to the server on the basis of the command performance result.

Preferably, the scheduling module includes: a first function unit for generating a device management scheduling sub-tree using the scheduling context delivered from the server; a second function unit for reading a scheduled command performing condition (i.e., a condition performing a command) of the device management scheduling sub-tree and thus continuously checking the state that the command performing condition is satisfied; a third function unit for requesting the command performing function unit of the command scheduling module to perform the device management command when the command performing condition is satisfied; a fourth function unit for determining whether the server should be reported on the command performance result of the command performing function unit according to a gating node value of the device management scheduling sub-tree; a fifth function unit for reporting to the server the performance result of the command transferred from the fourth function unit or the checked result of the command performing condition by the second function unit; and a sixth function unit for deleting the pre-established device management scheduling sub-tree according to a device management scheduling delete command requested from the server.

Preferably, in the method and the system, the scheduling context includes the device management command and scheduling information associated with the performance of the command, and has an XML (eXtensible Markup Language) text format.

Preferably, in the method and the system, the scheduling context includes: an information element for the command performing condition; an information element for scheduled device management commands; an information element for a user interface; and an information element for the status report gate.

Preferably, in the method and the system, the device management scheduling sub-tree includes: a schedule node; a node for indicating an identifier of the device management scheduling context; a node for indicating a performing condition of the scheduled device management command; a node for indicating information of the user interface; and a node for indicating whether to report the performance result of the command or a node for indicating a server address to report the performance result of the command.

Preferably, in the method and the system, the device denotes user equipment such as terminals, PDAs, notebook Personal Computers (PCs), desktop PCs, and the like.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 6 is a view showing an embodiment for a duration Dur element;

FIG. 7 is a view defining contents of a threshold Th element;

FIG. 8 is a view defining operators and specific symbols used in the Th element;

FIG. 9 is a view showing a format of the Th element;

FIG. 10 is a view showing an embodiment for constructing scheduling META data using the Th element;

DETAILED DESCRIPTION OF THE INVENTION

Reference will now be made in detail to some preferred embodiments of the present invention, examples of which are illustrated in the accompanying drawings.

The present invention provides a device management system in which a server can dynamically manage a device management scheduling of a client for device management or data synchronization, and a device management scheduling method in the corresponding system.

In addition, the present invention provides a device management system in which a server schedules a device management or a device management command of a client, and accordingly the client spontaneously reports the status of a device (e.g., a terminal), performs scheduled programs (diagnostic programs, status logging programs, virus detecting programs, and the like), and uses optimal parameter values according to the change of a usage environment at or in a specific time point or status, and a device management scheduling method in the corresponding system.

For this, in the device management system and the device management scheduling method thereof, the server transmits a Device Management (DM) scheduling context including a DM command and a scheduling information to a client of a target device, and the client generates a DM tree (i.e., a type of information management hierarchy or structure with multiple levels or branches that resemble a "tree") using the DM scheduling context and thereafter performs the corresponding DM command according to a command performing condition (i.e., a condition for performing a command). Preferably, the target device refers to user equipment (UE) such as terminals, PDAs, notebook Personal Computers (PCs) and desktop PCs, and the like, of which explanation will be provided only for the terminals merely for the sake of convenience. Hereinafter, some preferred embodiments of the present invention will now be described in detail.

Figure 1:
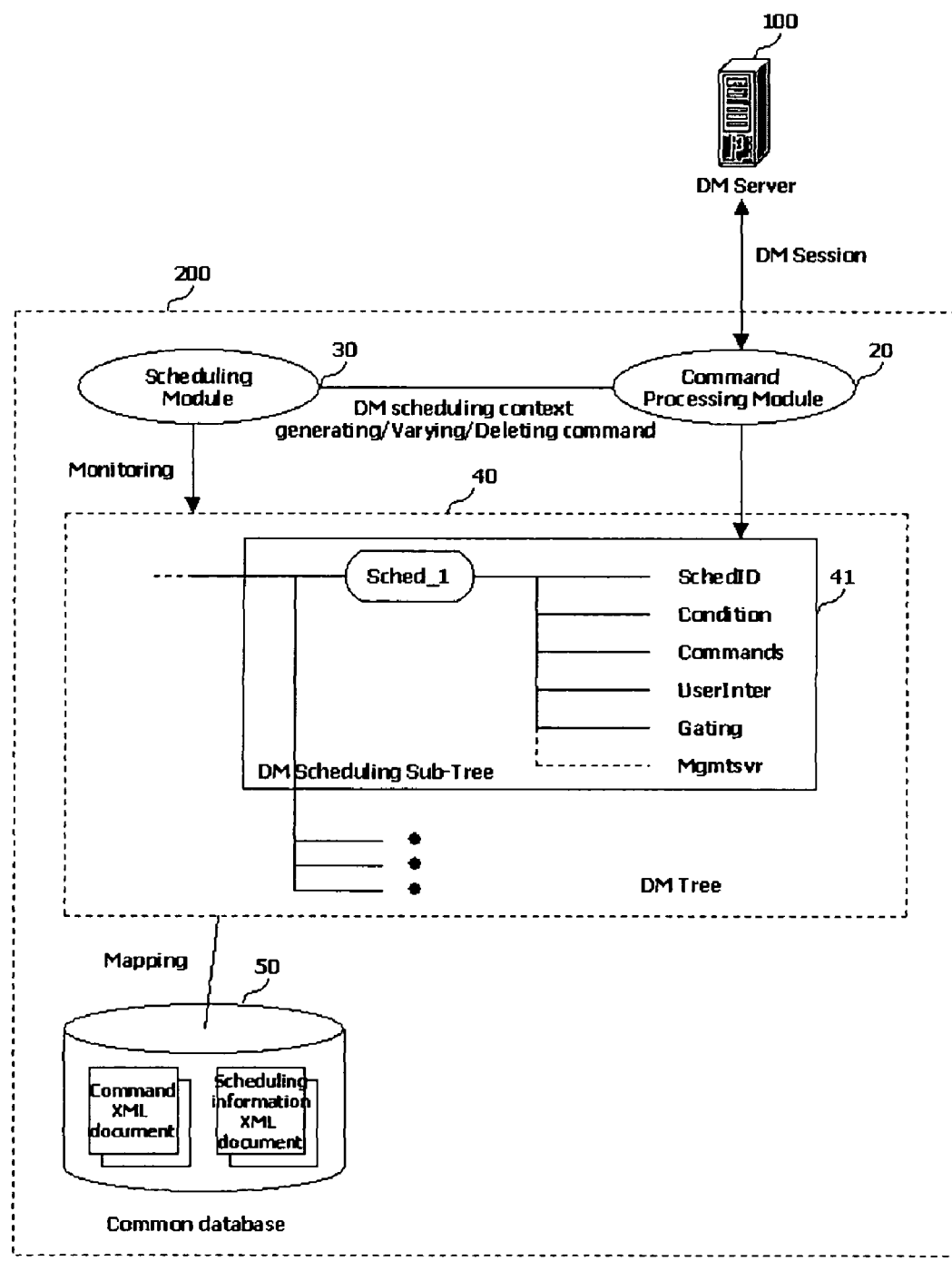
FIG. 1 is a block diagram showing a device management system according to the present invention.

FIG. 1 is a block diagram showing a device management system according to the present invention.

As shown in FIG. 1, the device management system according to the present invention includes: a Device Management (DM) server 100 for generating a DM scheduling context and transmitting such to a device (e.g., a terminal); and a DM client 200 for generating a DM tree in the terminal using the scheduling context transmitted from the DM server 100 and performing a corresponding DM command when a command performing condition (i.e., a condition for performing a command) is satisfied.

The DM client 200 includes: a command processing module 20 for receiving the scheduling context from the DM server 100; a scheduling module 30 for generating a DM tree 40 using the scheduling context transmitted from the command processing module 20, notifying the satisfaction of the command performing condition to the command processing module 20 in order to perform a corresponding DM command when the command performing condition is satisfied, and receiving a processing result of the DM command from the command processing module 20 to thereby selectively report it to the DM server.

The DM scheduling context includes the DM command and a schedule associated with the performance of the DM command, for instance, an information element Condition for the command performing condition, an information element Commands for the scheduled DM commands, an information element 'UserInter' for a user interface, an information element for a status report gating, and the like.

FIG. 1 shows an example for the DM tree generated by the DM client.

Referring to FIG. 1, the DM tree 40 includes at least one or more MD scheduling sub-trees 41, each of which includes a plurality of scheduling nodes, namely, a schedule node Sched_1, a SchedID node, a Condition node, a Commands node, a UserInter node, aGating node, and the like.

The schedule node Sche_1 indicates each device management scheduling (Sched_1, . . . ), and connects the Commands node and the Condition node to each other. Especially, the schedule node Sched_1 is used as a 'placeholder' (i.e., a position basis node). The Condition node indicates a condition that the DM command is to be performed. The Commands node indicates scheduled DM commands to be performed by the DM client when the command performing condition is satisfied (i.e., at a specific time point or status). Also, the UserInter node indicates whether user confirmation should be received regarding the performing of the corresponding command when the command performing condition is satisfied. The Gating node indicates whether to notify the performance result of the DM command to the DM server 100. In addition, the DM scheduling sub-tree 41 may further selectively (optionally) include a DM server Mgmtsvr node. Preferably, the Mgmtsvr node stores a server address to report the performance result of the DM command. For instance, if the processing result is to be reported to another server other than the corresponding DM server, or the DM server to which the processing result is to be reported is varied according to each processing result, the Mgmtsvr node includes ACL (Access Control List) information indicating a server having a management authority for each node.

The DM tree 40 denotes a logical data structure in which the DM server can remotely manage information stored in a common database 50 within the device by a DM session and DM protocols which are the same with respect to all different types of devices. The DM tree 40 provides names for each information stored in the common database 50 and provides a path for accessing each information. The DM tree 40 includes properties such as the logical and physical formats of the information, or the like.

The common database 50 in which various information that the DM server 100 can manage is stored, is used to store an actual value of each node within the DM scheduling sub-tree 41. In particular, the Commands node and the Condition node correspond to one command XML (extensible Markup Language) document and a scheduling XML document, respectively.

The command XML document includes DM commands to be processed by the DM client at and/or in the time point and the status that the scheduling condition is satisfied. Each command language is composed of commands defined by the DM protocols.

Figures 2, 3:
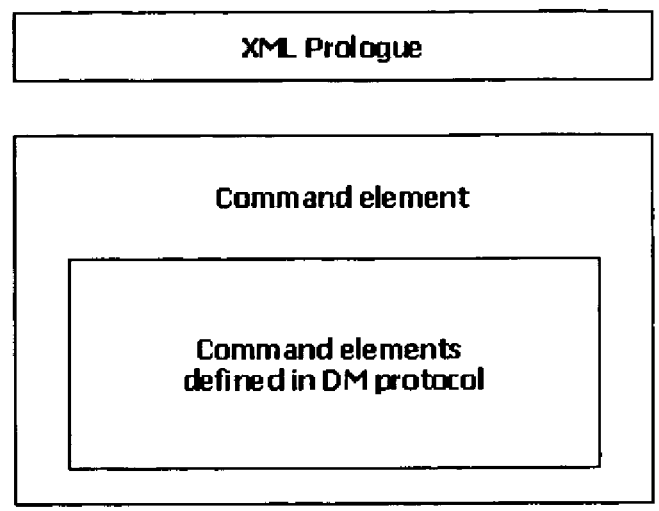
FIG. 2 is a view showing a structure of a command XML (extensible Markup Language) document shown in FIG. 1.
FIG. 3 is a view showing a DTD (Document Type Definition) of the command XML document.

FIG. 2 shows a construction of the command XML document, and FIG. 3 shows a Document Type Definition (DTD) of the command XML document. As shown in FIGS. 2 and 3, a root element of the command XML document refers to a Command element. A command language element defined in a corresponding DM protocol is included in contents of the Command element.

When the DM scheduling sub-tree 41 is constructed, the DM client 200 receives the DM commands from the DM server 100 and stores them in the common database 50. Thereafter, the DM commands can be varied or deleted in another DM session.

Figures 4, 5:
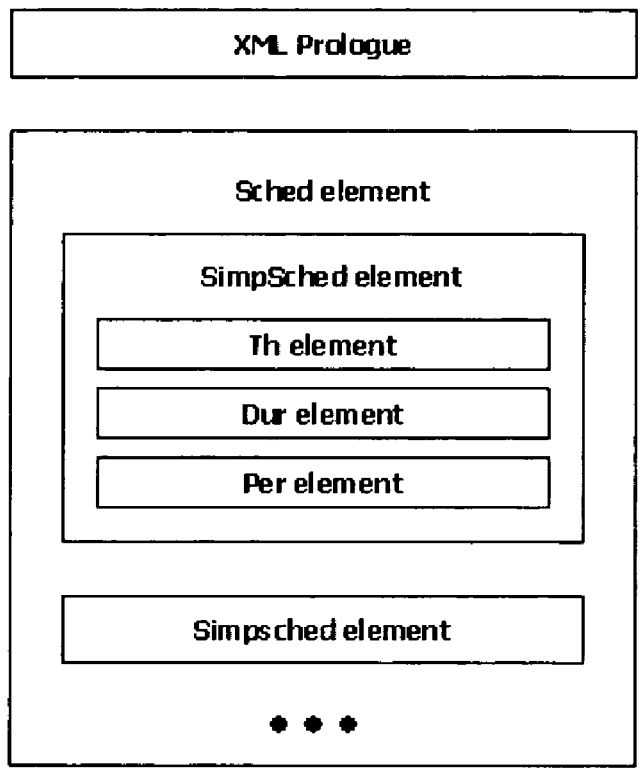
FIG. 4 is a view showing a structure of a scheduling information XML document shown in FIG. 1.
FIG. 5 is a view showing a DTD of the scheduling information XML document.

The scheduling XML document includes scheduling information which describes a condition in which the DM commands included in the command XML document are to be performed. FIG. 4 shows a construction of the scheduling information XML document, and FIG. 5 is a DTD of the scheduling information XML document.

Referring to FIGS. 4 and 5, the scheduling XML document is one valid XML document in which a <Sched> element is the root element. Each information element describes the scheduling conditions. When the DM scheduling sub-tree 41 is constructed, the DM client 200 receives the scheduling information from the DM server 100 and stores it in the common database 50. Afterwards, the scheduling information can be varied or deleted in another DM session.

The scheduling Sched element, as the root element of a scheduling information XML document, is composed of one or several simple scheduling SimpSched elements. The Sched element defines a trigger. In general, the Sched element corresponds to the sum of triggers that the SimpSched elements define. The trigger informs the DM client that the time point or condition, at/in which the DM commands included in the command XML document are to be performed, is satisfied.

The SimpSched element defines one simple scheduling specification and one or several triggers. A definitive scheduling specification is defined by putting several simple scheduling specifications together. The definitive scheduling specification is defined by the Sched element. The SimpSched element is composed of unit scheduling specifications defined by one or more of duration Dur, period Per and threshold Th elements. An interrelation for assigning a condition, in which the trigger generated from each element is to be delivered to the DM client, is formed between the unit scheduling specifications. That is, if a logical value of a particular unit element is 'false', a trigger generated from another unit element can never be delivered to the DM client.

The Dur element is a unit scheduling specification for designating a time period or a specific time point. The time period defines both a logical value and a trigger at the same time, and the specific time point only defines a trigger.

FIG. 6 is an embodiment of the duration Dur element.

Referring to FIG. 6, a content of the duration element, as a clear-text based on a special syntax to be described below, configures a starting point and an end point of the time range by using a special operator '. . . '. The duration element is represented with data and time. When both the data and time are used together, the data is positioned prior to the time and the data and time are divided by 'T'. For instance, Jul. 26, 2004, 23 hours 59 minutes 59 seconds is expressed as "2004-07-26T23:59:59". In addition, a minimum unit of the duration element is limited to 10 seconds, and '*', "im", and '~', define 'every hour', 'immediately', and 'continuously', respectively in sequence. At this time, the '~' may be used with the 'im'.

The period Per element, as a unit scheduling element for defining a time period, is used together with another unit scheduling element, and periodically generates sequential triggers while the condition is 'true'.

The Per element defines a period by a second unit, and refers to a numerical text represented by using an integer or a real number without any symbol. The Per element can not be used independently in the SimpSched element. The trigger can not be generated in the Per element while an associated condition is 'false', but be generated repeatedly when the condition is changed from 'false' into 'true' for the first time and while the condition maintains 'true' depending on the period defined by the Per element.

The threshold Th element, as a unit scheduling element for defining a value range, can define two different types of ranges and a specific value in which the trigger is generated. The Th element can be used together with other unit scheduling elements, such as another Th element, the Dur element, or the Per element. The Th element has an attribute value 'Hyst', and indicates a hysteresis value for a specific threshold. The Th element also has an attribute value 'MgmtObj' and a URI (Uniform Resource Indicator) of a management object associated with the Th element. Contents of the threshold element are a plain text string composed on the basis of a specific syntax to be described below.

FIG. 7 is a view defining contents of a threshold (Th) element, which is described on the basis of an ABNF (Augmented Backus-Naur Form) defined by RFC2234.

As shown in FIG. 7, the contents of the Th element are a plain text string composed of management object values, special symbols, and operators. Priorities of the operators are the same as the order enumerated in FIG. 8.

The contents of the Th element are represented as 'ThContent' composed of more than one 'ThContentItem' which is divided by an 'IS' operator. At this time, the 'ThContentItem' defines one of 'ThGroup', 'ThRange', and 'EventRange'.

The ThGroup defines one or more triggers which are represented by a combination between 'Threshold' and 'Delta' or a combination between 'TW(*)' and 'ThExc'. The trigger, which is an indicator for informing a client that an associated command should be processed, can be generated from the Th element, the Dur element and the Per element. At this time, the trigger generated from a trigger element is related to a change of the associated management object value.

The 'Threshold' defines a threshold defined as a certain value of the associated management object, and is used when defining a boundary value, a trigger, and delta of a threshold range.

The 'TW' which defines a special symbol referred to as a threshold wildcard represents all the management object values. At this time, the trigger is generated according to the change of the management object value, but the threshold wildcard does not define the condition.

The 'ThExc' defines a threshold excluded from another threshold group, and is generally used together with the threshold wildcard.

The 'Delta' is composed of one or more thresholds, each of which represents each delta. At this time, a boundary value of the event range is represented by event elements which indicate an event start and an event end. When the event start of the event range occurs, a logical value of the condition indicated by the 'EventRange' element is 'true'. When the event end of the event range occurs, the logical value of the condition is 'false'. The 'Event' denotes an event that a management object value has a specific value or falls within a certain range. Therefore, the threshold, the threshold group, and the threshold range may be used in order to represent the 'Event'. For instance, an event in which the management object value has a specific value or falls within a range of a default value can be the 'Event'. One or both sides of the event range can be opened, and the range of which both sides are opened is referred to as an event range wildcard.

The 'ThRange', which defines the threshold range, is used for defining a condition and for generating a trigger. A certain side of the threshold range can be opened. A special range of which both sides are opened is referred to as a threshold range wildcard. The threshold range wildcard can not be used independently, but be useful when using it together with 'ThRangeExc'. A trigger is generated when a logical value of the condition defined by the threshold range is changed into 'true' for the first time. Afterwards, whenever the logical value of the condition is changed, the trigger is also generated.

The 'ThRangeExc' element is composed of more than one TREP so as to represent an exclusion from a specific threshold range. At this time, the TREP is a component only used in the 'ThRangeExc'.

The 'EventRange' element, which indicates an event range, can define a condition and a trigger as the 'ThRange'. At this time, a boundary value of the event range is represented by event elements which indicate an event start and an event end. When the event start of the event range occurs, a logical value of the condition indicated by the 'EventRange' element is 'true'. When the event end of the event range occurs, the logical value of the condition is 'false'. The event denotes an event that a management object value has a specific value or falls within a certain range. Therefore, the threshold, the threshold group, and the threshold range may be used in order to represent the event. For instance, an event in which the management object value has a specific value or falls within a range of a default value can be the event. One or both sides of the event range can be opened, and the range of which both sides are opened is referred to as an event range wildcard.

FIG. 8 shows definitions of operators and special symbols used in the Th element, FIG. 9 shows properties of the Th element, and FIG. 10 shows an embodiment for constructing a DM scheduling context using the Th element.

The embodiment shown in FIG. 10 indicates a DM scheduling context for 'Get', which instructs to process the command 'Get' of a node value when it is equal to 1200, 1400, . . . , 3000, or every 60 seconds while the value falls between 1800 and 3000.

Figure 11:
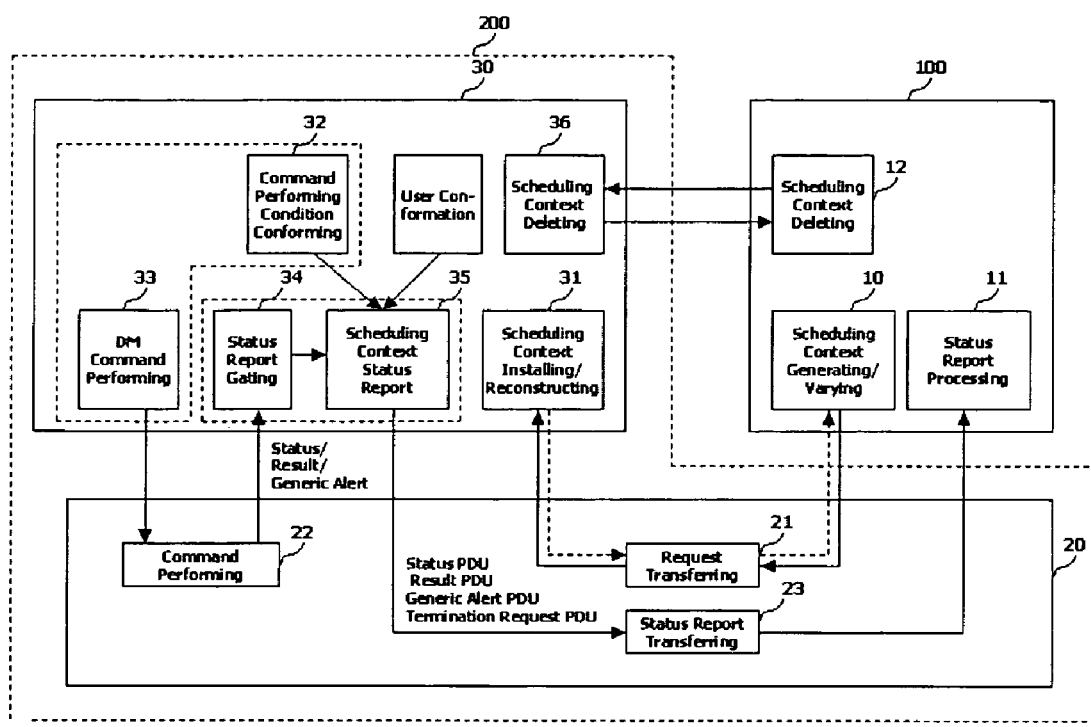
FIG. 11 is a view showing a construction of a device management system according to the present invention shown in FIG. 1 in detail.

FIG. 11 is a view showing a construction of the DM system shown in FIG. 1 in detail.

As shown in the drawing, the DM server 100 and the DM client 200 (scheduling module and command processing module) include a plurality of function units required for performing such scheduling generating/establishing, DM scheduling performing, DM scheduling varying/deleting, DM scheduling status reporting, and the like.

A scheduling context generating/varying function unit 10 provided in the DM server 100 generates the DM scheduling context, and requests the command processing module 20 of the DM client 200 to install or vary the DM scheduling context.

A scheduling context installing/reconstructing function unit 31 generates a DM scheduling sub-tree to thusly generate a DM tree, when the DM server 100 requests to install/vary the scheduling context through a request transferring function unit 21 of the command processing module 20. The scheduling context installing/reconstructing function unit 31 may receive user confirmation, if required, before installing the scheduling context.

A command performing condition confirming function unit 32 confirms the scheduled command performing condition within the DM scheduling sub-tree, and continuously checks the state that the command performing condition is satisfied. For instance, whether the command performing condition is satisfied can be determined when another management object value existing on the DM tree corresponds to a designated threshold value, or in a specific time point, or according to whether a specific event has occurred in the device. When the command performing condition is satisfied, the command performing condition confirming function unit 32 performs the user confirmation process, if required, according to information of the user interface UserInter within the DM scheduling sub-tree.

When the command performing condition is satisfied in the command performing condition confirming function unit 32 or a user permits a DM operation, a DM command performing function unit 33 requests a command performing function unit 22 of the command processing module 20 to perform the DM command.

The command performing function unit 22 performs the scheduled DM commands within the DM scheduling sub-tree according to the request for the DM command performing from the command performing condition confirming function unit 32. The command performing function unit 22 transfers a command performance result (status/result/generic alert) to the scheduling module 30 by a response message. The response message, for instance, includes command performance result codes with respect to that the commands have completely been performed, by which reason an error has occurred, how the device status is after performing the commands, or the like.

A status report gating function unit 34 filters data to be reported to the DM server 100. The status report gating function unit 34 determines whether the command performance result (status/result/generic alert) transferred from the command performing function unit 22 should be reported to the DM server 100.

A scheduling context status reporting function unit 35 reports to the DM server the command performance result (status/result/generic alert) transferred from the status report gating function unit 34, and may report to another server the command performance result using an ACL information of the Mgmtsvr node. The scheduling context status reporting function unit 35 transmits a status report PDU (Protocol Data Unit) using a particular protocol (e.g., a generic alert), thereby performing the process for the DM scheduling context status reporting.

Preferably, the status report PDU basically includes PDUs (status PDU, result PDU, and generic alert PDU) for transmitting a status command language, a result command language, and a generic alert command language, and a termination request PDU for the DM scheduling context which a user is performing.

The command performing condition confirming function unit 32 and the DM command performing function unit 33 of the scheduling module 30 may be integrated in one function unit if necessary. The status report gating function unit 34 can also be integrated with the scheduling context status reporting function unit 35 if necessary (indicated by a dotted line).

Explanations will now be provided for functions of performing/varying/deleting the DM scheduling and of reporting the DM scheduling status in more detail with reference to the accompanying drawings. In this case, a DM session is established between the DM server 100 and the DM client 200. While the session is established, an authentication process between the DM server 100 and the DM client 200 is performed.

Function of Establishing DM Scheduling

Establishing the DM scheduling is requested by generating a Device Management (DM) scheduling context, connecting a DM session, and transferring the DM scheduling context to a device (e.g., a terminal) through a DM protocol.

Figure 12:
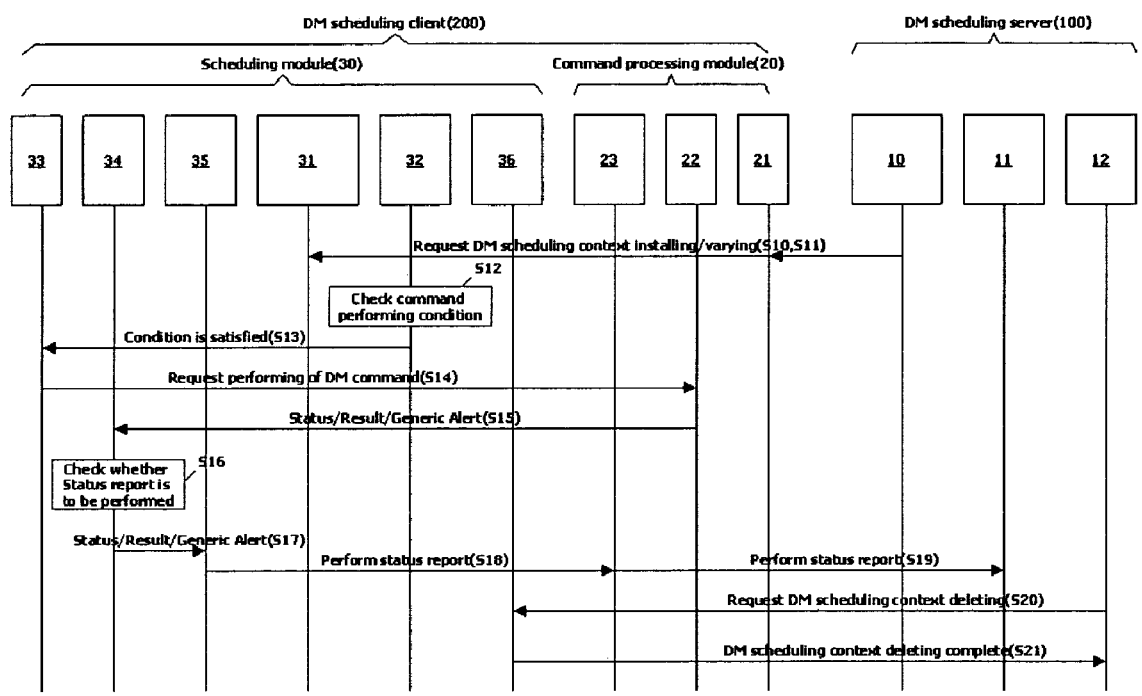
FIG. 12 is a view showing a signal flow in a device management scheduling method in a device management system according to the present invention.

That is, as shown in FIGS. 11 and 12, the scheduling context generating/varying function unit 10 of the DM server 100 generates a DM command and a scheduling context including a schedule with respect to a performing of the DM command. The scheduling context generating/varying function unit 10 transfers the generated scheduling context to the device (e.g., the terminal) through the DM protocol. Here, the scheduling context generating/varying function unit 10 adds the DM commands using an ADD command, and makes all the DM commands to be scheduled one group using an automic command. As a result, the scheduling context generating/varying function unit 10 allows the device (e.g., the terminal) to process the one group of DM commands all together. Also, the scheduling context generating/varying function unit 10 further includes a UI alert command in the automic command, so as to receive the user confirmation before the device installs the corresponding scheduling context.

The scheduling context having transmitted from the DM server 100 to the DM client 200 is transferred to the scheduling context installing/reconstructing function unit 31 of the scheduling module 30 by the request transferring function unit 21 of the command processing module 20 (S11).

After receiving the user confirmation according to the UI alert command, the scheduling context installing/reconstructing function unit 31 generates the DM tree 40 using the DM scheduling context, thereby installing the DM scheduling context. The DM scheduling context, as shown in FIG. 1, is installed by generating the DM scheduling sub-tree 41 having at least one or more scheduling nodes (=DM objects) on the DM tree 40. When the DM tree is formed, actual values of a plurality of the scheduling nodes are stored in the common database 50. In particular, the Condition node value and the Commands node value having a valid XML document format are stored, respectively, in a command XML document and a scheduling information XML document.

Furthermore, when the DM scheduling sub-tree 41 is generated, the scheduling context installing/reconstructing function unit 31 certifies whether syntax and context of the XML document of the DM scheduling context transmitted are correct, and whether the DM scheduling context can be installed (e.g., an access authority of a server, capability of a client, etc). Afterwards, the scheduling context installing/reconstructing function unit 31 notifies the DM server 100 of the installation result with respect to the request for installing the DM scheduling context (indicated as a dotted line).

Function of Performing DM Scheduling

After successfully certifying the XML document and thus generating the DM tree 40, namely, one DM scheduling sub-tree 41, the DM client 200 analyzes the scheduling information XML document of the database 50 to perform a scheduling process. That is, when the one DM scheduling sub-tree 41 is generated, the command performing condition confirming function unit 32 reads information of the DM command performing condition of the DM scheduling context from the scheduling information XML document by a constant period (Interval property of Th element), and then continuously checks the state that the DM command performing condition is satisfied (S12). Whether the command performing condition is satisfied, for instance, can be determined when another management object value existing on the DM tree reaches a designated threshold value, or at a specific time point, or according to whether a specific event has occurred in the device.

When the command performing condition is satisfied, if the user confirmation should be received according to the information of the user interface UserInter within the DM scheduling sub-tree 41, the user confirmation process is performed. In the user confirmation process, a guide (i.e., notice, information, etc) related to performing the DM commands is provided on the screen, and accordingly the user can permit or cancel the performing of the DM commands. If the user cancels the DM command performing, the command performing condition confirming function unit 32 does not perform the scheduled DM commands but performs the process for confirming the command performing condition once again.

If the command performing condition is satisfied in the command performing condition confirming function unit 32, or the user permits the DM operation (S13), the DM command performing function unit 33 requests the command performing function unit 22 of the command processing module 20 to perform the DM commands (S14). The command performing function unit 22 performs the DM commands scheduled within the DM scheduling sub-tree 41 according to the request from the DM command performing function unit 33, and transfers the command performance result (status/result/generic alert) to the status report gating function unit 34 by using a response message (S15).

The status report gating function unit 34 determines whether the command performance result (status/result/generic alert) is to be reported to the DM server 100 according to a gating node value of the DM scheduling sub-tree 41 (S16).

The status report gating function unit 34 provides a part of the DM command performance result to the scheduling context status reporting function unit 35 according to the gating node value (S17). The scheduling context status reporting function unit 35 reports the corresponding command performance result to the status report processing function unit 11 of the DM server 100 by the status report transferring function unit 23 of the command processing module 20 (S18 and S19). At this time, the scheduling context status reporting function unit 35 transmits a PDU (Protocol Data Unit) using a particular protocol (e.g., a generic alert) and performs the process for reporting the DM scheduling context status. The status report PDU basically includes PDUs (status PDU, result PDU, and generic alert PDU) for transmitting a status command language, a result command language, and a generic alert command language.

Figure 13:
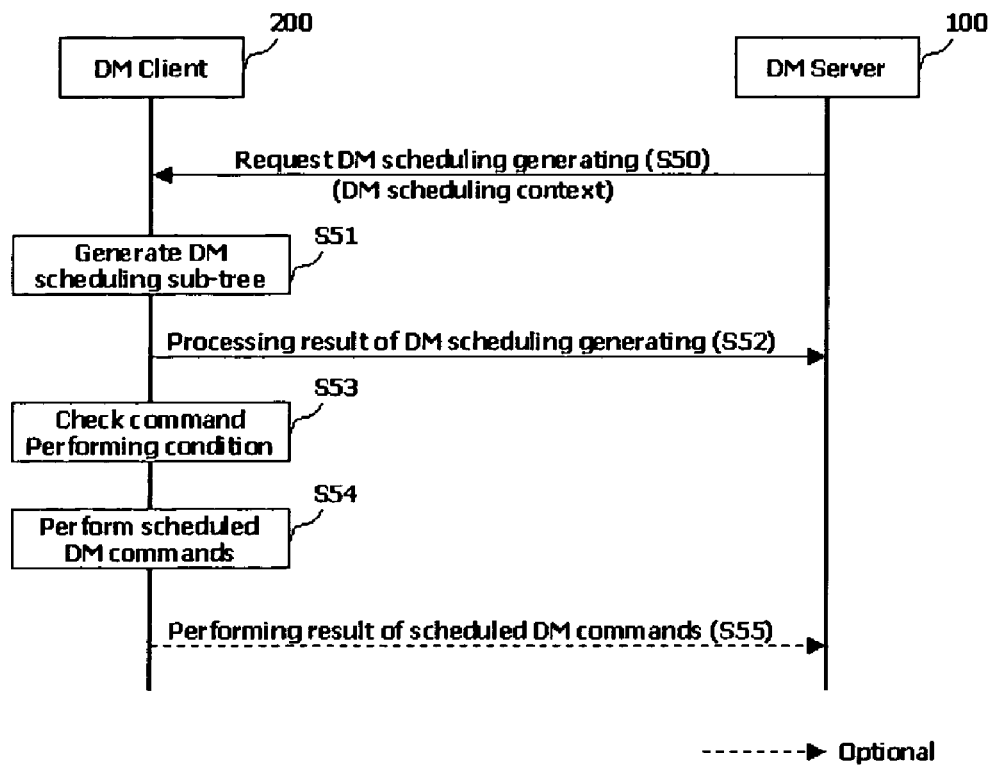
FIG. 13 is a detailed view showing a signal flow in a step of generating and performing a DM (Device Management) scheduling in the device management scheduling method in the device management system according to the present invention shown in FIG. 12.

That is, as shown in FIG. 13, the DM server 100 transfers the Dm scheduling context to the DM client 200 and requests the DM client 200 to generate the DM scheduling (S50). The DM client 200 having requested for generating the DM scheduling certifies the corresponding command (request), and generates the DM scheduling sub-tree using the DM scheduling context, of which result is then transmitted to the DM server 100 by the DM client 200 (S51 and S52). Afterwards, the DM client 200 checks the command performing condition of the DM scheduling sub-tree (S53). When the corresponding condition is satisfied, the DM client 200 processes the scheduled DM commands (S54), and selectively reports the processing result to the DM server 100 (S55).

Function of Varying DM Scheduling

As the DM server 100 varies the DM scheduling context which has already been installed and transfers the varied DM scheduling context through a DM protocol, varying the DM scheduling is requested (a process for transferring the DM scheduling context). Its signal flow is the same as that in the performing of the DM scheduling aforementioned. In this case, because the DM scheduling sub-tree already exists within the device, a Replace command can generally be used. When the process for transferring the DM scheduling context is performed, the DM server allows the DM client to manage all the scheduled DM commands by a group by transmitting the automic command. In addition, when the process for transferring the DM scheduling context is performed, the user confirmation should be received before performing the process for varying the DM scheduling context by including the UI alert command in the automic command. After receiving the user confirmation, the DM scheduling context installing/reconstructing function unit 31 of the DM client 100 reconstructs the DM scheduling context within the device.

That is, the DM scheduling context installing/reconstructing function unit 31 generates a new DM scheduling sub-tree within the DM tree 40 using the new DM scheduling context having transferred, and notifies the DM server 100 of the processing result of the request for varying the DM scheduling context (indicated by a dotted line).

Figure 14:
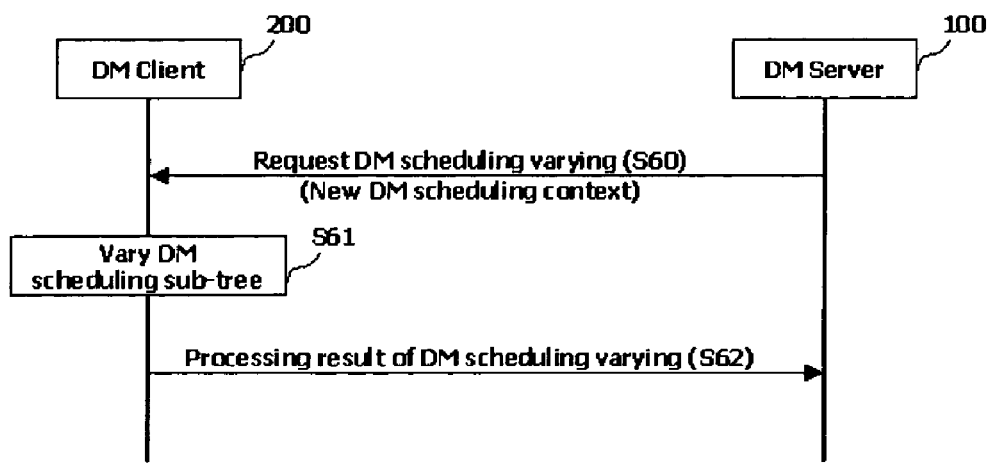
FIG. 14 is a detailed view showing a signal flow in a step of varying the DM scheduling in the device management scheduling method in the device management system according to the present invention shown in FIG. 12.

In other words, as shown in FIG. 14, the DM server 100 transfers the new DM scheduling context to the DM client 200 and requests the DM client 200 to vary the DM scheduling (S60). The DM client 200 having requested for varying the DM scheduling certifies the corresponding command (request), and varies the DM scheduling sub-tree using the new DM scheduling context, of which result is then transmitted to the DM server 100 (S61 and S62).

Function of Deleting DM Scheduling

Deleting the DM scheduling refers to deleting the DM tree which has already been generated, namely, the DM scheduling sub-tree 41 within the DM tree 40 by the DM server 100. The request for deleting the DM scheduling context is transferred from a scheduling context delete requesting function unit 12 of the DM server 100 to a scheduling context deleting function unit 36 of the DM client 200 (S20). At this time, the scheduling context delete requesting function unit 12 transmits to the scheduling context deleting function unit 36 a Delete DM command using a URI of the DM scheduling sub-tree 41 to be deleted. Therefore, the scheduling context deleting function unit 36 deletes the corresponding DM scheduling sub-tree 41. As a result, the scheduling context deleting function unit 36 deletes the DM scheduling context that has been installed, of which result is notified to the scheduling context delete requesting function unit 12 (S21).

Figure 15:
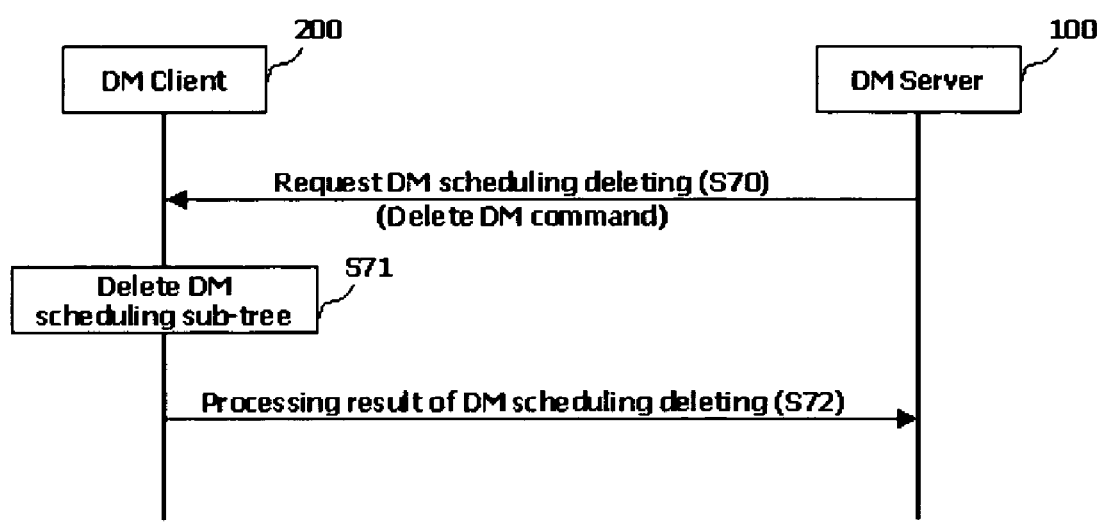
FIG. 15 is a detailed signal flow view in a step of deleting the DM scheduling in the device management scheduling method in the device management system according to the present invention shown in FIG. 12.

That is, as shown in FIG. 15, the DM server 100 transfers the Delete DM command to the DM client 200 and requests the DM client 200 to delete the DM scheduling (S70). The DM client 200 having requested for deleting the DM scheduling certifies the corresponding command (request) and varies the existing DM scheduling sub-tree, of which result is then transmitted to the DM server 100 (S71 and S72).

Function of Reporting DM Scheduling Status

The explanations have been provided for the case that the DM scheduling status report is performed by the status report gating, namely, the case that the command processing result is reported to the DM server 100. However, the DM scheduling status report can be performed when an error may occur while performing the process for confirming the command performing condition or when a user requests a termination of the scheduling context while the user performs the confirming process. In these cases, the scheduling context status reporting function unit 35 transmits the DM scheduling context status report PDUs to the DM server 100. The status report processing function unit 11 of the DM server 100 having received the control PDUs performs the DM scheduling context status report processing.

As aforementioned, in the present invention, the server transmits the DM command and the DM scheduling context including the scheduling information to the client within the device, and the client installs the DM scheduling context to thereafter perform the corresponding DM command according to the scheduling condition. As a result, it is effective for the server to dynamically manage the DM schedule of the client.

That is, in the related art, in order for the server to confirm a certain state of the terminal, the DM session should be generated and the status of the terminal should be questioned, periodically. This method has required great communication resources but no particular effect has been obtained. As a result, it causes waste of communication resources and shortening of battery using time. Therefore, as shown in the present invention, when the terminal is under a specific situation, the status of the terminal is reported to the server to thereby solve such problems.

In addition, many programs, for instance, diagnostic programs, status logging programs, virus detecting programs, and the like, may be installed or exist in the terminal. In case of utilizing the present invention, the DM server can perform the scheduling so that the programs can be performed at/in a desired time point or state. Once the performing of the program is scheduled, the server does not have to individually establish the DM session in order to perform the program every time, which leads to reduction of radio resource consumption. These advantages can be useful in a situation that a communication channel can not be connected between the DM client and the DM server.

Furthermore, various parameters for operating the terminal correctly exist in the terminal. These parameters are determined as values by which the terminal can obtain an optimal performance. However, if the usage environment is changed while the terminal is used, the optimal parameter values may be changed according to the change. Therefore, by utilizing the present invention, the server detects the environment of the terminal to thusly perform the scheduling in order to use the optimal parameter values according to the detection. This adjustment for the parameter values can be performed in real time without any separate DM session, thereby providing user satisfaction and superior performance.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A device management scheduling method in a terminal that performs device management with a server, the method comprising:
   receiving a schedule for device management from the server via a device management session using device management protocols, wherein the schedule comprises a device management task and a trigger for performing the device management task;
   installing the received schedule into device management objects;
   performing the device management task in response to the trigger in the schedule without receiving a device management command from the server; and
   reporting a result of performing the device management task to the server according to a gating node in the device management objects,
   wherein the gating node indicates whether the result of performing the device management task is to be reported to the server.

2. The method of claim 1, further comprising installing a new schedule from the server.

3. The method of claim 1, further comprising receiving a request to delete the schedule from the server.

4. The method of claim 1, wherein the schedule complies with an eXtensible Markup Language (XML) document format.

5. The method of claim 1, wherein the schedule is received together with one or more of an add command, an automic command, and a UI (User Interface) alert command.

6. The method of claim 1, wherein the schedule further comprises one or more of:
   a node for the trigger for performing the device management task;
   a node for the device management task; and
   a node for a user interaction.

7. The method of claim 6, wherein each of the nodes includes one or more elements.

8. The method of claim 6, wherein the node for the trigger includes one or more of:
   a duration element for defining a specific time value or time range;
   a period element for defining a time period; and
   a threshold element for defining a threshold value.

9. The method of claim 1, wherein installing the schedule comprises:
   checking validity of the received schedule; and
   generating at least one sub-tree in a device management tree using the corresponding schedule.

10. The method of claim 1, wherein the schedule further comprises one or more of:
    an ID node;
    a trigger node;
    a task node; and
    a user interaction node.

11. The method of claim 10, wherein the trigger node denotes a condition for performing the device management task, wherein the condition indicates a time when the device management task should be executed, and the task node denotes the device management task.

12. The method of claim 10, wherein the user interaction node denotes whether user confirmation should be received when the trigger is satisfied.

13. The method of claim 10, wherein the schedule further includes a Mgmtsvr node denoting a server address.

14. The method of claim 1, wherein the device comprises at least one of a terminal, a PDA (Personal Digital Assistant), a notebook PC, and a desktop PC.

15. The method of claim 1, wherein performing the device management task comprises:
 checking whether the trigger is satisfied;
 performing user confirmation according to information of a user interface when the trigger is satisfied; and
 performing the device management task when the user confirmation is received.

16. A device management scheduling method in a terminal that performs device management with a server, the method comprising:
 installing a schedule for the device management into device management objects, wherein the schedule is received from the server via a device management session using device management protocols;
 performing a device management task according to a trigger included in the schedule, wherein the device management task is performed in response to the trigger and without receiving a device management command from the server; and
 reporting a result of performing the device management task to the server according to a gating node in the device management objects,
 wherein the gating node indicates whether the result of performing the device management task is to be reported to the server, and
 wherein the device management objects have an access control list including an identifier of the server that owns the schedule and the schedule includes the device management task and the trigger for performing the device management task.

17. A mobile communications terminal comprising:
 a DM (device management) client for establishing a device management session with a server using DM protocols, receiving a schedule for device management from the server, installing the schedule received from the server into device management objects, and reporting a result of performing a device management task to the server according to a gating node in the device management objects,
 wherein the gating node indicates whether the result of performing the device management task is to be reported to the server, and
 wherein the schedule includes the device management task and a trigger for performing the device management task, wherein the device management task is performed in response to the trigger and without receiving a device management command from the server; and
 a DM scheduling agent for performing the device management task if the trigger is satisfied.

18. The terminal of claim 17, wherein the DM scheduling agent performs a user confirmation process, if required, according to information of a user interaction of the device management objects.

19. The terminal of claim 17, wherein the DM scheduling agent reports the result of performing the device management task to another server using information of a device management server node of the device management objects.

20. The terminal of claim 17, wherein the device management objects include:
 an ID node;
 a trigger node;
 a task node; and
 a user interaction node.

21. The terminal of claim 20, wherein the ID node denotes an identifier of the schedule and the trigger indicates a condition for performing the device management task, wherein the condition indicates a time when the device management task should be executed.

22. A device comprising:
 a device management (DM) scheduling client that communicates DM commands with a DM server using DM protocols,
 the DM scheduling client comprising a first module and a second module that cooperate together, such that the first module establishes a DM session with the DM server to receive a schedule for device management from the DM server,
 wherein the schedule supports at least time-based or event-based scheduling and contains information related to a list of scheduled management tasks, conditions specifying when the scheduled management tasks are to be executed, user interaction specifications, and status reporting specifications, and
 the second module installs a DM tree using the schedule received by the first module, the DM tree being related to scheduling management objects and having one or more nodes related to DM scheduling,
 wherein the scheduling management objects have an access control list (ACL) that identifies a particular DM server that owns the schedule,
 wherein the one or more nodes comprise a task node that denotes a DM task and a trigger node that denotes a trigger for performing the DM task, and
 wherein the DM task is performed in response to the trigger and without receiving a DM command from the DM server.

23. The device of claim 22, wherein the one or more nodes further comprise a gating node that is subordinate to the task node, the gating node denoting whether a performance result of the DM task or command is to be reported to the DM server.

24. The device of claim 22, wherein the DM scheduling client performs in cooperation with the DM server, at least installing, reconstructing, generating, varying, deleting, or status reporting of a scheduling content.

25. The device of claim 22, wherein the DM scheduling client further performs a procedure for certifying a validity of the schedule for device management received from the DM server.

26. The device of claim 22, wherein the DM scheduling client performs certain DM tasks or commands at a desired time based upon the schedule, wherein the desired time is after an end of the DM session.

27. The device of claim 22, wherein the DM scheduling client is implemented in at least a user equipment (UE), a mobile terminal, a PDA, a portable computer, or a desktop computer.

* * * * *